United States Patent [19]

Strauss et al.

[11] 4,199,422

[45] Apr. 22, 1980

[54] PROCESS FOR CATAPHORETICALLY COATING THE SURFACES OF ELECTRICALLY CONDUCTING SUBSTRATES

[75] Inventors: Udo Strauss; Hans-Joachim Streitberger, both of Münster, Fed. Rep. of Germany

[73] Assignee: BASF Farben & Fasern AG, Hamburg, Fed. Rep. of Germany

[21] Appl. No.: 962,401

[22] Filed: Nov. 20, 1978

[30] Foreign Application Priority Data

Nov. 18, 1977 [DE] Fed. Rep. of Germany ....... 2751498

[51] Int. Cl.$^2$ ............................................. C25D 13/10
[52] U.S. Cl. ................................................ 204/181 C
[58] Field of Search .................... 204/181 C, 292, 293

[56] References Cited

U.S. PATENT DOCUMENTS

| | | | |
|---|---|---|---|
| 3,954,588 | 5/1976 | Hazan et al. | 204/181 C |
| 4,086,153 | 4/1978 | Ariga et al. | 204/181 C |

Primary Examiner—Howard S. Williams
Attorney, Agent, or Firm—Gilbert L. Wells

[57] ABSTRACT

Method of cataphoretically coating the surfaces of electrically conducting substrates acting as cathodes in an electrical lacquering bath based on aqueous solutions and/or aqueous dispersions of salts of cationic film forming agents with organic and/or inorganic acids wherein the coating bath contains chloride ions dissolved therein with nitrate ions, nitrite ions, or a mixture of nitrate and nitrite ions in a weight ratio from about 0.01 to 8 parts of chloride ions to 1 part of nitrate ions, nitrite ions, or a mixture of nitrate and nitrite ions.

12 Claims, No Drawings

PROCESS FOR CATAPHORETICALLY COATING THE SURFACES OF ELECTRICALLY CONDUCTING SUBSTRATES

CROSS REFERENCE TO A RELATED APPLICATION

Applicants claim priority under 35 U.S.C. 119 for application No. P 27 51 498.3 filed Nov. 18, 1977 in the Patent Office of the Federal Republic of Germany.

BACKGROUND OF THE INVENTION

The present invention relates to cataphoretically coating the surfaces of electrically conducting substrates acting as cathodes in an electrical dip lacquering process and a coating bath therefor based on aqueous solutions and/or aqueous dispersions of salts of cationic film forming agents with organic and/or inorganic acids. The present invention furthermore relates to using the coating bath for making cataphoretic coatings and to using anodes of stainless steel.

The state of the art of cataphoretic coating of metallic surfaces and the bath compositions used therein may be ascertained by referring to U.S. Pat. Nos. 3,230,162; 3,455,806; 3,682,814; 3,922,212; 3,984,299 and 4,001,155 the disclosures of which are incorporated herein.

As known to the prior art, cathode coatings are deposited in an electrical dip bath by passing a DC current between an anode and a cathode immersed in the bath. The electrical dip or coating bath contains aqueous solutions or aqueous dispersions of salts of cationic film forming agents with organic and/or inorganic acids, which may furthermore contain the conventional pigments and fillers. The pH value of the dip bath as a rule is set between 1 and 9. Under the influence of the DC current, the cationic film forming agent deposits on the substrate acting as cathode, while the acids used for neutralization migrate to the anode and concentrate there.

To date, only graphite electrodes have proved to be free from difficulties as anodes. The use of iron or steel electrodes as anodes as a rule cannot be practically implemented because these metals decay and dissociate relatively quickly. The dissociating iron furthermore interferes with the coating bath, whereby the deposition of the cationic film forming agent on the cathode is adversely affected.

Again so-called stainless steel electrodes with higher resistance to corrosion are not applicable in every case because they are corroded by pitting, especially in those cationic coating baths containing chloride ions. This pitting in the end results in complete dissociation of the stainless steel anodes too. It has been found that about 0.25 mg. of iron per coulomb are dissolved in an electrical dip basin containing chloride ions. The theoretical value for complete dissociation is about 0.29 mg. of iron lost per coulomb. In practice, this means that stainless steels too will dissolve just as quickly in constant use as simple iron or steel electrodes unless their application is in baths extensively free of chloride ions. The especially degrading chloride ions reach the coating baths through the use of hydrochloric acid as the neutralizing means, or also as impurities from the industrially prepared synthetic resins, pigments and fillers. Thus the epoxy resins used in practice contain chloride ions. Such a concentration of chloride ions obviously do not interfere when the coating means are applied in a form other than electrical dip lacquering means.

SUMMARY OF THE INVENTION

Having in mind the limitations of the prior art it is an object of the present invention to eliminate pitting of stainless steel anodes used in cathodic electrical dip lacquering.

This object surprisingly was achieved by a coating bath for cataphoretically coating the surfaces of electrically conducting substrates acting as cathodes in an electrical dip lacquering process on the basis of aqueous solutions and/or aqueous dispersions of salts of cationic film-forming agents with organic and/or inorganic acids which is characterized by a content of ions of chloride and ions of nitrate, nitrite or a mixture of nitrate and nitrite dissolved in the coating bath in a weight ratio of about 0.01 to 8 parts of chloride ions to 1 part of nitrate ions, nitrite ions, or a mixture of nitrate and nitrite ions.

It was found furthermore that best results were obtained when the coating bath contains at least 40 mg/liter of chloride ions.

Even though as a rule the nitrate ions may be obtained from arbitrary selection of nitrates, it is especially advantageous to dissolve copper nitrate in the coating bath as the nitrate ion donor.

An object of the present invention furthermore is the use of the coating bath of the present invention for making coatings on the surfaces of electrically conducting substrates acting as cathode, by means of cataphoresis, and by substantially baking the coating.

Another object of the present invention is a process for making coatings on electrically conducting substrates acting as cathodes by means of cataphoresis while using the coating bath of the invention, this process being characterized in that the anode is a stainless steel with at least 12% Cr, 0 to 17% Ni, 0 to 3% Mo, 0 to 0.5% C, 0 to 1% Si, 0 to 2% Mn and possibly further small proportions of Al, Ti, Nb, Ta. Preferably those stainless steels are used which evidence an austenitic structure.

The coatings are obtained by dipping the substrate to be coated while under voltage, whereupon the cataphoretic deposition of the cationic film forming agent takes place.

In a modified embodiment, the coatings also are obtained in that the substrate to be coated is dipped into the coating bath while free from applied potential and that thereafter the cataphoretic deposition of the cationic film forming agent takes place.

Again, the surface of the substrate to be coated may be sprayed with the liquid from the coating bath before the cataphoretic deposition takes place.

For the first time, the object of the invention makes it possible to use stainless steels as long-performance anodes in cataphoretic electrical dip lacquering without suffering pitting and the subsequent dissociation of the anode. It was found that for a surface of the stainless steel electrode remaining smooth, the iron losses were only 0.01 mg per coulomb. If in addition a dialysis membrane is inserted between anode and cathode, the loss of iron drops further to 0.004 mg per coulomb. The use of dialysis membranes as semi-permeable membranes or as ion-exchange diaphragms is known. Most of the time these membranes are in the form of cells or containers or boxes housing the anode.

It was both surprising and unforeseeable that this outstanding advantageous effect takes place only when chloride ions and ions of nitrate, nitrite or mixtures thereof are simultaneously present in dissolved form in the coating bath. The proportions between the dissolved chloride ions and dissolved nitrate, nitrite or mixtures of nitrate and nitrite are determinant. The ratio ranges from about 0.01 to 8 parts of chloride ions to 1 part of ions of nitrate, nitrite or a mixture of nitrate and nitrate.

DESCRIPTION OF THE PREFERRED EMBODIMENT

When the ratio varies so that a larger proportion of nitrate ions and/or nitrite ions is present, the result will not be critically affected. But pitting occurs immediately when the ratio so changes that more chloride ions are present in the coating bath than corresponding to the claimed ratio of chloride ions to nitrate ions and/or nitrite ions. Coating baths containing no nitrate ions and/or nitrite ions, rather only chloride ions, experience ever more intense pitting and increasingly rapid dissociation of the anode as the proportion of chloride ions rises in the electrical dip bath, and therefore it is all the more surprising that pitting shall be always less with more chloride ions in the bath, provided that this bath also contains nitrate ions and/or nitrite ions in the specific ratio between 0.01 to 8 parts by weight of chloride ions to 1 part by weight of nitrate ions and/or nitrite ions.

To achieve especially advantageous results, the chloride ion content in the electrical dip bath is set for a value of at least 40 mg of chloride ions per liter of coating bath. The corresponding amount of nitrate ions and/or nitrite ions must be added to that quantity.

The practically complete elimination of pitting of stainless steel anodes rests on the presence of nitrate ions or of nitrite ions in the coating bath. This effect also will take place when nitrate and nitrite ions are present together. The adjustment of the desired concentrations of chloride ions, nitrate ions and/or nitrite ions as a rule is implemented by adding salts soluble in the coating bath. Generally these are alkali salts or earth alkali salts, however ammonium nitrate and manganese nitrate also are suitable. These salts may be used individually or in mixtures. When using silver nitrate or nitrite individually or in combination, excessively high amounts of soluble chloride ions can be reduced at the same time by the formation of insoluble silver chloride. The use, singly or in combination, of copper nitrate is proposed as being especially advantageous, as this salt simultaneously allows achieving a dual effect relating both to the advantageous influence of the nitrate ions on the anode and especially to the fact that copper ions are deposited on the anode together with the film forming binders and thus contribute to improving the corrosion resistance of the coating films and the adhesion to the cathode metals. This effect of the copper ions on the cathode is known and not claimed herein.

The scope of this application covers those electrically conducting substrates forming the cathode being coated which are metallic objects of steel, iron, iron alloys and other metals.

The deposition of cationic film forming agents by means of cataphoresis is known. The electrically conducting workpieces act as cathodes on which the cationic film forming agents are deposited in the form of coatings. Contrary to the case of anaphoretic deposition, no metal ions from the metal surface to be coated are dissolved in this case. Ordinarily the film forming agents to be deposited in cataphoresis are basic or amphoteric homo and/or copolymers, polycondensates and/or polyaddition products and/or combinations of the three classes just cited.

No patent protection is sought for the preparation and application of these cationic film forming agents. Such products are described for instance in U.S. Pat. No. 3,455,806 or in French Pat. No. 1,313,355, in German patent applications Nos. 2,252,536 and 2,320,301 and U.S. Pat. No. 4,001,155. As a rule all cataphoretically depositing synthetic resins are suitable. Only the simultaneous presence of chloride ions and nitrate ions and/or nitrite ions in the coating bath containing the synthetic resins is essential to the present invention, especially when stainless steel electrodes must be used as anodes in the electrical dip lacquering process.

Again no patent protection is sought for the preparation of aqueous solutions or of aqueous dispersions of the salts of such cationic film forming agents. The preparation takes place in known manner using known methods. Illustratively, solutions of the film-forming binders are dissolved or dispersed in organic solvents by combining with suitable organic or inorganic acids in water. In general the pH value of the solutions or of the dispersions is suitably set to a value between 1 and at most 9, preferably between 3 and 8.5.

Practically all known inorganic and/or organic acids or acid derivatives are suitable as the acid component acting as the anion in cataphoretically deposited binders, Examples are hydrochloric acid, sulfuric acid, phosphoric acid, carbonic acid, acetic acid, propionic acid, formic acid, citric acid, lactic acid, malic acid, maleic acid, fumaric acid, phthalic acid, also the monoesters of maleic acid, fumaric acid or phthalic acid with mono or polyvalent alcohols, further many other compounds acting as acids when dissociated.

The cationic film forming agents are either present alone in the aqueous coating bath or in combination with other synthetic resins soluble or dispersable in water and mixed with cataphoretically depositing cationic film forming agents. Suitable examples are the aminoplast condensates, the phenoplast condensates, epoxy resins, alkyd resins, polyurethanes or mixtures of such and other synthetic resins. The amount by weight of these additional other synthetic resins appropriately in general shall not exceed the amount by weight of the salts of the cataphoretically depositing binders. As is conventional in relation to other coating means, the coating bath also may contain electrophoretically depositing accessory substances such as pigments, fillers, hardening catalysts, means for improving the reaction, anti-frothing agents, adhesion improvers, etc.

Where required, additional solvents, for instance such alcohols as isopropanol, butanol or also others such as tetrahydrofurane, aliphatic and/or aromatic hydrocarbons, esters, ethers, ether esters and others may be used, in order to favorably affect the solubilities and dispersing properties in the coating bath.

The conditions for cataphoretic deposition are those conventional in practice. For instance the coatings are deposited at the conventional DC potentials between 2 and 500 volts, preferably between 50 and 300 volts and at a temperature preferably between 20° and 40° C. in a time interval from 0.3 to 5 minutes. Depending on the kind of cationic film forming agent used, and the conditions of deposition, coatings up to 40 microns thick are obtained. After coating is terminated, the coated iron metal surfaces are removed from the coating bath and appropriately rinsed with water and heated to be baked from 5 to 180 minutes to temperatures from 80° to 250° C. for hardening. The baking time drops with temperature. The best results are obtained for baking temperatures between 120° and 190° C. and for baking times between 40 and 150 minutes.

Besides the conventional carbon electrodes, the anode of the invention may also consist of stainless steel with a proposed content of at least 12% Cr, 0 to 17% Ni, 0 to 3% Mo, 0 to 0.5% C, 0 to 1% Si, 0 to 2% Mn and where appropriate further small amounts of Al, Ti, Nb, Ta. The stainless steels proposed herein preferably are of austenitic structures, though those with ferritic and martensitic structures also are suitable.

Illustrative stainless steels are listed below with their compositions in % by weight:

| Abbreviation and Material No. per German Industrial Standard DIN 17 440 | | Composition |
| --- | --- | --- |
| 1. X5CrNi18/9 | 1.4301 | 0.07%C, 1.0% Si, 2.0% Mn, 18.0% Cr, 10.0% Ni; |
| 2. X10CrNiTi18/9 | 1.4541 | 0.1% C, 1.0% Si, 2.0% Mn, 18.0% Cr, 10.0% Ni, 0.5% Ti; |
| 3. X10CrNiMoTi18/10 | 1.4571 | 0.1% C, 1.0% Si, 2.0% Mn, 17.5% Cr, 11.5% Ni, 2.25%Mo, 0.5% Ti; |
| 4. X6CrMo17 | 1.4113 | 0.07%C, 1.0% Si, 1.0% Mn, 17.0% Cr, 1.0% Mo. |

SPECIFIC EXAMPLES

The outstanding performance of the coating baths with additional contents in chloride ions and nitrate ions and/or nitrite ions in a ratio of 0.01 to 8 parts of chloride ions to one part nitrate ions and/or nitrite ions is discussed in the examples which follow. The parts therein are by weight, and percentages are by weight also.

PREPARING A CATIONIC FILM FORMING AGENT A

A cationic resin is prepared according to German Offengungsschrift 2 320 301, which represents a Mannich condensation product based on the conversion product of a modified bisphenol-A-resin from formaldehyde and secondary amines with epoxy resins.

984 parts (13.1 moles) of 40% formaline are dripped to 1,100 parts (4.8 moles) of bisphenol A, 917.5 parts (8.7 moles) of diethanolamine, 332.5 parts (2.5 moles) of di-2-methoxyethylamine and 375 parts of isopropanol at 20° to 25° C. The mixture is stirred for one hour at 30° C. and then heated for 3 hours at 80° C. Isopropanol and water are distilled off under a slight vacuum. A Mannich condensation product is obtained in the form of a yellow resinous material with a solid content of 91%.

2,542 parts of this Mannich condensation product are reacted with 70 parts of paraformaldehyde and condensed for 9 to 10 hours at 70° C. A viscous material with a solid content of 90% is obtained.

Of that, 544 parts of the Mannich base are made to react with 136.5 parts of a commercial reaction product of bisphenol A and epichlorhydrin (epoxy value: 0.2) (Epoxy resin Epoxy 1/33 of Chemapol) and 54.5 parts of a commercial reaction product of pentaerythrite and epichlorohydrin (epoxy value: 0.57) (Epoxin 162, BASF AG) while using 34 parts of dimethyl glycol ether for 3 hours at 60° C.

A clear viscous resin with a mean molecular weight of 860 and a residual formaldehyde content of 0.3% is obtained. The solid (content) is 70%.

PREPARING A CATIONIC FILM FORMING AGENT B

A cataphoretically depositing film forming agent was prepared in accordance with German Offenlegungsschrift 2,252,536 as follows:

100 parts of a polyglycidylether of bisphenol A (epoxy equivalent weight 910, melting point 90° to 104° C., hydroxyl value 0.34)
are dissolved in
367.2 parts of N-methylpyrrolidone and 244.8 parts of 4-methoxy-4-methylpentanone,
and
517.0 parts of a partly capped diisocyanate prepared from the reaction of
348.0 parts of 2-4-toluoldiisocyanate with
260.5 parts of 2-ethylhexanol
are added.

Upon addition of 5 drops of dibutyl tin dilaurate as catalyst, this mixture is heated at 100° C. until no more free isocyanate groups can be found. Thereupon the mixture is cooled to 60° C. and 79.2 parts of diethylamine are added.

The mixture is then heated again to 100° C. and this temperature is maintained for 2 hours. Following cooling a self-crosslinking cataphoretically depositing polyurethane resin with a solid content of 73.5% is obtained.

PREPARING A CATIONIC FILM FORMING AGENT C

A cataphoretically depositing film forming agent is prepared per example 1 of the U.S. Pat. No. 3,455,806:
A solution of a copolymer consisting of
200 parts of N-vinylimidazole,
250 parts of 2-oxahexylamide of acrylic acid,
300 parts of 2-ethylhexylester of acrylic acid,
200 parts of styrene and
50 parts of 4-hydroxybutylester of acrylic acid in 1,000 parts of butanol, prepared conventionally by solution polymerization
are neutralized with hydrochloric acid to a value of pH=5.2. The solid content is about 50%.

EXAMPLE 385 parts by weight of the cataphoretically depositing film forming agent A are neutralized with 2% by weight of acetic acid referred to the solid content of the film forming agent A for the purpose of preparing a coating bath. Then 221 parts by weight of a pigment paste homogenized by a three-roll mill are added, and this paste consists of
366 parts by weight of the above described film forming agent A reacted with acetic acid,
174 parts by weight of talc, 45 parts by weight of carbon black,
90 parts by weight of aliphatic fatty alcohols with 10 to 14 C atoms,
325 parts by weight of isopropanol.

The mixture is diluted to a solid content of 12% using deionized water and stirred for 48 hours at 30° C. prior to deposition. The pH value of the diluted coating bath is 7.9. This bath is divided into portions of 1,000 cm³ and each portion receives the following:
(a) by adding sodium chloride, the ion content of chloride is set at 280 mg/liter in 1,000 cc of the coating bath;
(b) sodium chloride is added to 1,000 cc of the coating bath until the chloride ion content is 280 mg/liter; also 75 mg of ammonium nitrate are added;
(c) potassium chloride is dissolved in 1,000 cc of coating bath until the chloride ion content is 280 mg/liter; also 187 mg of silver nitrate are added; and
(d) ammonium chloride is dissolved in 1,000 cc of coating bath until the chloride content is 60 mg/liter; also 35 mg of copper nitrate $Cu(NO_3)_2 \cdot 3H_2O$ are dissolved.

Sheet metal strips 10×10 cm acting as cathodes are then coated under the same conditions of deposition using the coating baths (a), (b), (c) and (d).

The immersed anode is a stainless steel electrode X5CrNi18/9-1.4301 containing 0.07% C; 1.0% Si; 2.0% Mn; 18.0% Cr and 10.0% Ni; the temperature of the coating bath is kept at 30° C. 100 sheet metal strips are coated with an average of 40 coulomb each in a continuously operating sheet metal coating machine.

0.25 mg of iron per coulomb are dissolved in the presence of pitting from the anode dipping into coating bath 1(a) in proportion to the current intensity required for depositing the coatings on the sheet metal strips acting as cathodes.

The dissolution equivalent of the anodes in coating baths 1(b), 1(c) and 1(d) amounts only to 0.01 mg Fe/coulomb, there being no pitting.

Experiment 1(d) is repeated with the mere difference that the stainless steel electrode used is located in a dialysis box enclosed by a semi-permeable membrane. The box is sealed with respect to the bath and is provided above the liquid level with feeds and drains for the dialysis liquid. In this instance the anode dissolution equivalent amounts only to 0.004 mg Fe/coulomb.

The same result is obtained if coating baths with film forming agents B and C are used in lieu of that with film forming agent A.

We claim:

1. In a method for cataphoretically coating the surfaces of electrically conducting substrates acting as a cathode using a coating bath comprising aqueous solutions, aqueous dispersions or mixtures thereof of salts of cationic film forming agents with organic acids, inorganic acids or mixtures thereof, said coating bath containing dissolved ions of chloride by passing a DC current between an anode and said cathode immersed in said coating bath, the improvement comprising: said anode comprising an electrode of stainless steel containing at least 12% Cr, 0 to 17% Ni, 0 to 3% Mo, 0 to 0.5% C, 0 to 1% Si, 0 to 2% Mn and trace amounts of Al, Ti, Nb and Ta and in addition to said ions of chloride comprising ions of nitrate, nitrite or mixtures thereof in a weight ratio from about 0.01 to 8 parts of chloride ions to 1 part of ions of nitrate, nitrite or mixtures thereof.

2. The method of claim 1 wherein said coating bath contains at least 40 mg of chloride ions per liter.

3. The method of claim 2, wherein said ions of nitrate are produced by copper nitrate dissolved in said coating bath.

4. The method of claim 1, wherein said cationic film forming agents are reaction products from epoxy resins with condensed phenol Mannich-bases, secondary amines carrying a hydroxyalkyl group and formaldehyde.

5. The method of claim 1, wherein said agents are reaction products from epoxy resins with amines, aminocarboxylic acids, diisocynates or mixtures thereof.

6. The method of claim 1, wherein said cationic film forming agents are copolymerizates into which have been polymerized:
(1) from 3 to 50% by weight of a mono- or bicyclic compound with a heterocycle of five to six links and containing from 1 to 3 heteroatoms, one of which is a nitrogen atom carrying a vinyl group;
(2) from 3 to 30% by weight of an amide, alkylamide, oxyalkylamide or oxa-alkylamide of (meth)acrylic acid;
(3) from 20 to 94% by weight of an alkylester or (meth)acrylic acid or an (alkyl)vinylbenzol; and
(4) up to about 30% by weight of another comonomer unsaturated with respect to ethylene.

7. The method of claim 1, further comprising the step of baking the cataphoretically deposited coating.

8. The method of claim 1, comprising dipping said substrate to be coated into said coating bath without a current passing through it, carrying out a cataphoretic deposition thereupon, and baking the catophoretically deposited coating.

9. The method of claim 1, comprising dipping said substrate to be coated into said coating bath with a potential applied to said substrate, carrying out a cataphoretic deposition thereupon, and baking the catophoretically deposited coating.

10. The method of claim 1, wherein said substrate to be coated is sprayed with said coating bath before being dipped into it and that thereupon cataphoretic deposition takes place in said coating bath.

11. The method of claim 1, wherein said stainless steel anode is located in a dialysis box with a semi-permeable membrane.

12. The method of claim 1, wherein said DC current has a potential between 2 and 500 volts, the temperature of said coating bath is between 20° and 40° C. and the method is carried out for a time interval of 0.3 to 5 minutes and coatings up to 40 microns are obtained on said cathode.

* * * * *